United States Patent
Reams, III

(10) Patent No.: US 7,636,314 B1
(45) Date of Patent: Dec. 22, 2009

(54) SYSTEM AND METHOD FOR ROUTING INCOMING MODEM CALLS FOR DIAL UP INTERNET ACCESS

(75) Inventor: Orin Paul Reams, III, Charles Town, WV (US)

(73) Assignee: Sprint Communications Company L.P., Overland Park, KS (US)

( * ) Notice: Subject to any disclaimer, the term of this patent is extended or adjusted under 35 U.S.C. 154(b) by 968 days.

(21) Appl. No.: 10/461,228

(22) Filed: Jun. 13, 2003

(51) Int. Cl.
*G01R 31/08* (2006.01)

(52) U.S. Cl. ....................... 370/237; 370/352
(58) Field of Classification Search ............. 370/237, 370/351; 379/221.03
See application file for complete search history.

(56) References Cited

U.S. PATENT DOCUMENTS

| | | | | |
|---|---|---|---|---|
| 4,991,204 A | * | 2/1991 | Yamamoto et al. | 379/221.01 |
| 5,555,100 A | * | 9/1996 | Bloomfield et al. | 358/402 |
| 5,631,897 A | * | 5/1997 | Pacheco et al. | 370/237 |
| 5,809,128 A | * | 9/1998 | McMullin | 379/215.01 |
| 5,896,448 A | * | 4/1999 | Holt | 379/221.03 |
| 5,978,381 A | * | 11/1999 | Perlman et al. | 370/432 |
| 6,104,711 A | * | 8/2000 | Voit | 370/352 |
| 6,122,255 A | * | 9/2000 | Bartholomew et al. | 370/237 |
| 6,185,194 B1 | * | 2/2001 | Musk et al. | 370/260 |
| 6,301,352 B1 | * | 10/2001 | Chung et al. | 379/229 |
| 6,324,279 B1 | * | 11/2001 | Kalmanek et al. | 379/229 |
| 6,738,461 B2 | * | 5/2004 | Trandal et al. | 379/142.02 |
| 2002/0156914 A1 | * | 10/2002 | Lo et al. | 709/238 |

* cited by examiner

*Primary Examiner*—Jayanti K Patel
*Assistant Examiner*—Hooman Houshmand

(57) ABSTRACT

A system and method for receiving dial-up Internet access calls with an available remote Internet Service Provider modem is provided. A data tandem in a modem center to which a data call is directed determines whether it can receive the call with a modem associated with it. If not, the data tandem queries other local data tandems to determine whether they receive the call with an associated modem. If no local data tandem can receive the call, remote data tandems are queried for an available modem. When an available modem is located, the dial-up Internet access call is routed to that modem, whether local or remote. The invention may also be used to optimize the routing of data calls to maintain optimal modem performance.

22 Claims, 8 Drawing Sheets

SYSTEM AND METHOD FOR ROUTING INCOMING MODEM CALLS FOR DIAL UP INTERNET ACCESS

CROSS-REFERENCE TO RELATED APPLICATIONS

None.

STATEMENT REGARDING FEDERALLY SPONSORED RESEARCH OR DEVELOPMENT

None.

BACKGROUND OF THE INVENTION

Internet access has become an important part of everyday life for millions of individuals in the United States and abroad. Access to the Internet is useful for communication via e-mail and other electronic media. Of course, Internet access is also useful for individuals wishing to pursue on-line research, follow the news, discuss a hobby with other enthusiasts, or simply entertain themselves with a variety of web sites. For whatever reason, Internet access has become an indispensable utility for many users.

Access to the Internet requires a connection between a user's computer and a server linked to the larger Internet so that data can be exchanged between the user's computer and the servers that make up the Internet. There are many ways to connect the user's computer to a server. One of the earliest, and still exceptionally popular, methods is to use the telephone network for a "dial-up" connection to a server.

For dial-up Internet access, a user's computer employees a modem, either internal to the computer or external to the computer, to dial over standard telephone lines a telephone number provided by the Internet service provider, or ISP, to access the ISP's server. The ISP server is then connected to the Internet, typically via any of various broadband connections. The user's modem converts between packet based data transmitted by the computer and the circuit based connection used by the telephone system. Essentially, the user's modem converts between different signal formats. When the modem call is placed, it is connected to a modem linked to a server provided by the ISP. The ISP modem performs a function similar to that performed by the user's modem, in that it converts between the signals between itself and the telephone modem to a format suitable for use with the ISP server that accesses the internet. Obtaining an available ISP modem can be difficult if dial-up usage is high, leading to busy signals delivered to users. Even when dial-up calls can be received by an available ISP modem, a high volume of calls that are poorly distributed to available modems will lead to poor modem performance, such as dropped calls, unacceptably slow modem performance, and hanging modems that do not disconnect but cease to respond to the user.

The industry includes a wide variety of firms that describe themselves as ISPs, from very small businesses to national and multi-national corporations. At the larger end of the industry, the ISPs are household names, with a truly nationwide (and sometimes greater) presence, with customers in every region of America. Such ISPs typically do not own the modems they use to allow their customers to access the Internet, and instead lease access to modems maintained by others, such as telecommunication companies. Regardless of who actually owns the ISP modems that customers must connect with to access the internet, the principles of modem availability and allocation are the same.

Maintaining adequate available modems presents a serious challenge to an ISP. Too few available modems results in busy signals, poor modem performance, connection difficulties, and other technical errors ultimately resulting in lost customers and decreased revenue. However, modems are costly and providing more than necessary seriously impacts the finances of an ISP. In the rapidly changing business climate of the Internet in general, and ISP's in particular, all unnecessary costs must be eradicated in face of declining margins. Maintaining the proper amount of available ISP modems that adequately balances the needs of customers with ISP finances can be difficult. Particularly difficult is predicting future demand of dial-up services. Unfortunately, an error in the prediction in future demand, either predicting too high or predicting too low, can be costly either in terms of unnecessary capital expenditures or customer dissatisfaction.

Typical dial-up Internet usage patterns exacerbate the difficulties of providing an adequate, but not excessive, amount of ISP modems. Dial-up Internet usage typically peaks during evening hours. Non-peak usage, for example during the working day or late at night, is typically only a small fraction of peak usage. This usage pattern results in modems that were acquired by an ISP to meet peak usage demands sitting idle during a substantial portion of the day. Obviously, idle modems are a poorly utilized resource that adds unnecessary costs to an ISP's business operation.

Factors besides usage patterns can impact the availability of modems provided by an ISP. Most notably, activities such as maintenance, upgrading, and repairing an ISP's facilities can result in limited modem availability or outages. Of course, to the degree that the ISP can control the timing of maintenance, it will typically be scheduled during off-peak times when usage will be low. Real world situations sometimes prevent such ideal scheduling from occurring. Unexpected events can lead to partial or complete outages of available modem. Also, once maintenance or upgrade has begun, unexpected events can delay the completion of that work into peak-usage time.

Many ISP's cover a large geographic area, requiring multiple modem centers to provide local dial-up ISP modem telephone numbers for customers. At present, dial-up ISP users on one coast of the United States may be receiving busy signals while modems for the same ISP sit idle on the other coast. A system allowing for over-flow dial-up traffic to be directed to another location during peak-usage times would benefit both the dial-up ISP's and dial-up ISP customers by providing additional available modems when needed without requiring capital investment to acquire modems to sit idle at non-peak times. To date, attempts to solve problems related to excess demand placed upon the modems available on a particular modem center have typically focused on allowing calls to be redirected to other modems at the same modem center. Unfortunately, this typical solution of adding modems locally is unsatisfactory, as ISP modems added to meet time of day peak demand capacity needs will remain idle off peak demand times, which is most of a day. During the few hours of the day when additional ISP modems added locally to meet local demand peaks, other, geographically remote, modems will be largely idle, their local peak usage time either having already passed or not yet occurred. No prior system or method for routing dial-up calls for internet access among ISP modems has allowed geographically remote modems to be used to meet local peaks in demand for available ISP modems.

BRIEF SUMMARY OF THE INVENTION

The present invention provides a system and method whereby dial-up modem calls can be answered by an ISP modem remote from the local modem center to which the call was initially directed. A data tandem with switching capabilities may be used in accordance with the invention to determine whether a remote access server controlled by that data tandem possesses an available modem when a dial-up call needs to be received. If no remote access server controlled by that data tandem possesses an available modem, the data tandem queries other local data tandems, if any are provided, to determine whether a remote access server controlled by the other local data tandem(s) possesses an available modem. If the first data tandem and other local data tandems cannot obtain an available modem with the remote access servers they control, the first data tandem queries remote data tandem(s) for an available modem. In response to such queries, the remote data tandem(s) queries its remote access servers for an available modem. When an available modem is identified, the first data tandem signals the telephone system switch to connect the dial-up call to that available modem. If no available modem can be identified, a busy signal is transmitted to the user.

The present invention may also be used to optimize dial-up ISP modem performance by avoiding overloading a particular remote access server's modems with a call volume that impairs ISP modem performance while other modems are optimally available. In this variation, the first data tandem will initially determine whether one of the remote access servers it controls possesses a modem that can optimally receive the dial-up call. If none of the remote access servers controlled by the first data tandem possesses a modem that can optimally receive the dial-up call, the first data tandem then queries other local data tandems and then remote data tandems to identify a remote access server with a modem that can optimally receive the dial-up call. If no dial-up modem can be identified that can optimally receive the dial-up call, the first data tandem then seeks for any available modem to which the call can be connected, as described above. In this fashion, ISP modem performance can be optimized, thereby avoiding dropped calls, slow modem performance, or hanging ISP modems.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

Figure 1:
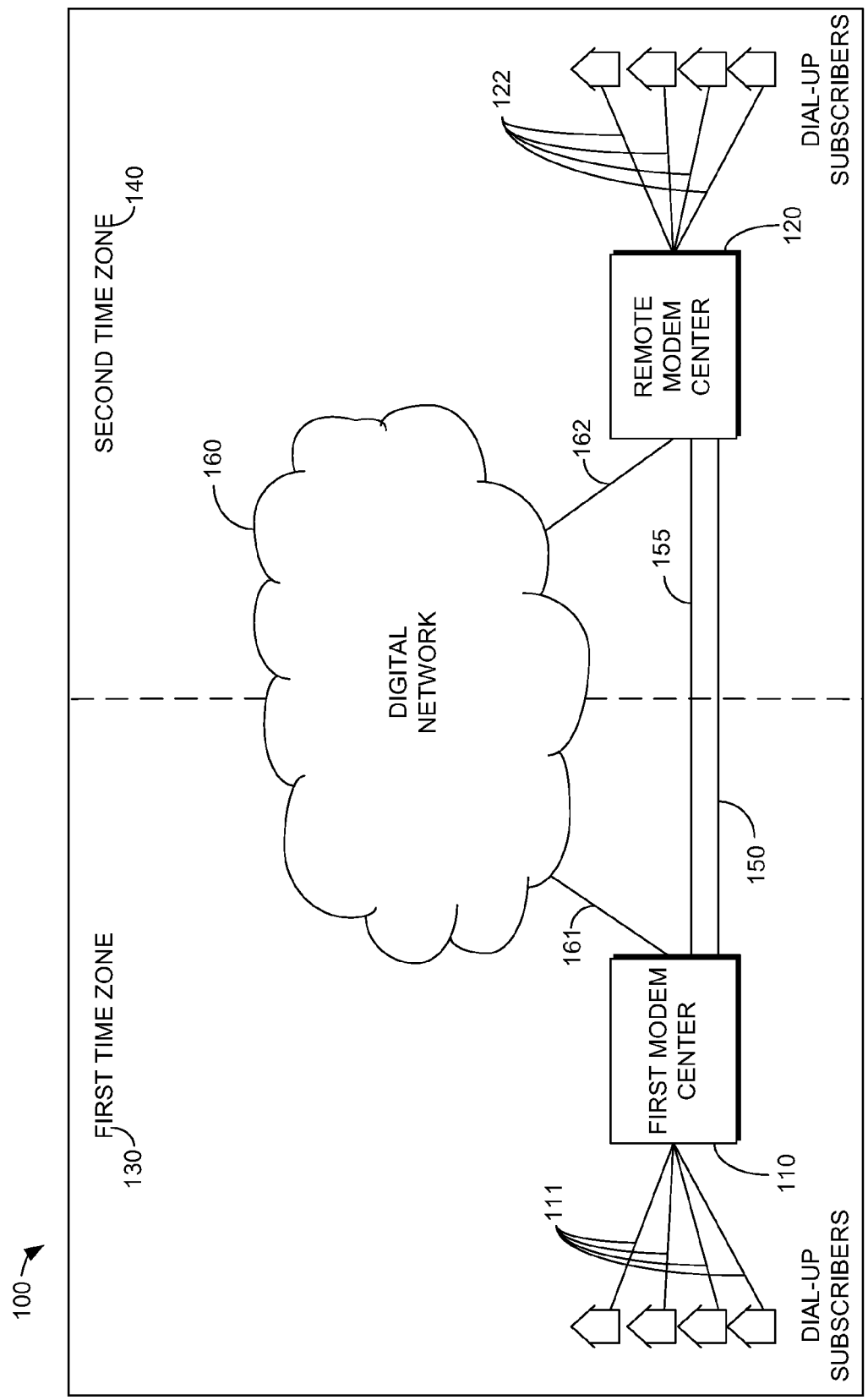
FIG. 1 illustrates a schematic representation of a system in accordance with the present invention.

The system and method in accordance with the present invention may be implemented in a variety of forms. One such form of a system in accordance with the present invention is illustrated in FIG. 1. FIG. 1 illustrates a system 100 including a first modem center 110 and a remote modem center 120. Dial-up subscriber lines 111 enter the first modem center 110. When a dial-up subscriber wishes to access the Internet via the ISP, a circuit-based link is established over the local telephone network via the lines 111 between the dial-up user's modem and the first modem center 110. Likewise, the remote modem center 120 is accessed in a like fashion by dial-up subscribers using telephone lines 122. As shown in FIG. 1, the first modem center 110 is geographically located in a first time zone 130, while the remote modem center 120 is geographically located in a second time zone 140. The positioning of the first modem center 110 and the second modem center 120 in a first time zone 130 and a second time zone 140, respectively, allows the ISP avoid a significant overlap of peak usage times for local dial-up subscribers. To minimize any possible overlap between peak dial-up usage in the first time zone 130 and the second time zone 140, the first time zone 130 and the second time zone 140 may be separated by several time zones. For example, the first time zone 130 may be the United States' Eastern time zone and the second time zone 140 may be the United States' Pacific time zone. However, a multiple time zone separation is not necessary and the first time zone 130 and the second time zone 140 may be contiguous.

When a dial-up call is placed by a user to the first modem center 110 via telephone line 111, the first modem center 110 determines whether that call can be received by a modem available in the first modem center 110. If the first modem center 110 does not possess an available modem, the first modem center 110 queries the remote modem center 120 using for example, a network connection 150 between the first modem center 110 and the remote modem center 120. If the remote modem center 120 possesses an available modem that can receive the dial-up call, the remote modem center 120 signals the first modem center 110 via the network connection 150 as to the identity of its available modem. The first modem center 110 then routes the dial-up call to the available modem in the remote modem center 120 via dedicated connection. The first modem center 110 connects to a digital network 160, which may be the internet, through connection 161. The second modem center 120 connects to the digital network 160 through connection 162.

Figure 2:
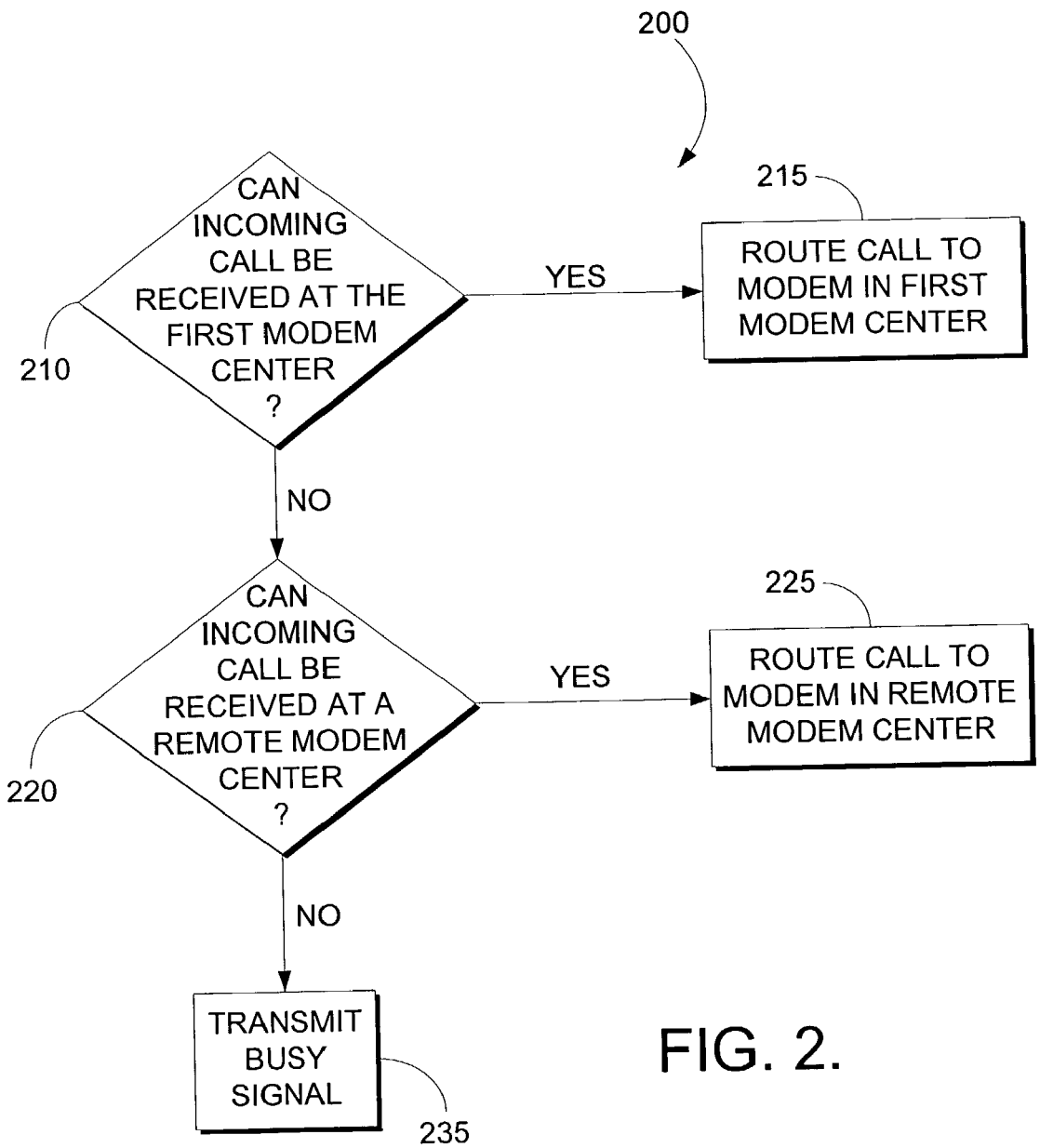
FIG. 2 illustrates a method in accordance with the present invention to route incoming modem calls to an available modem.

Referring now to FIG. 2, a method 200 in accordance with the present invention is illustrated. When a dial-up modem call is placed, the first step 210 of method 200 is to determine whether the incoming call can be received at the first modem center. If the result of step 210 is to conclude that the call can be received at the first modem center, then the next step 215 is to route the call to the available modem in the first modem center. If the result of step 210 is the conclusion that the call cannot be received at the first modem center, the next step 220 is to determine whether the incoming call can be received at a remote modem center. If the conclusion of step 220 is that the call can be received at a remote modem center, the next step 225 is to route the call to the available modem in the remote modem center. If the conclusion of step 220 is that the call cannot be received by a remote modem center, then the next step 235 is to transmit a busy signal to the caller.

Figure 3:
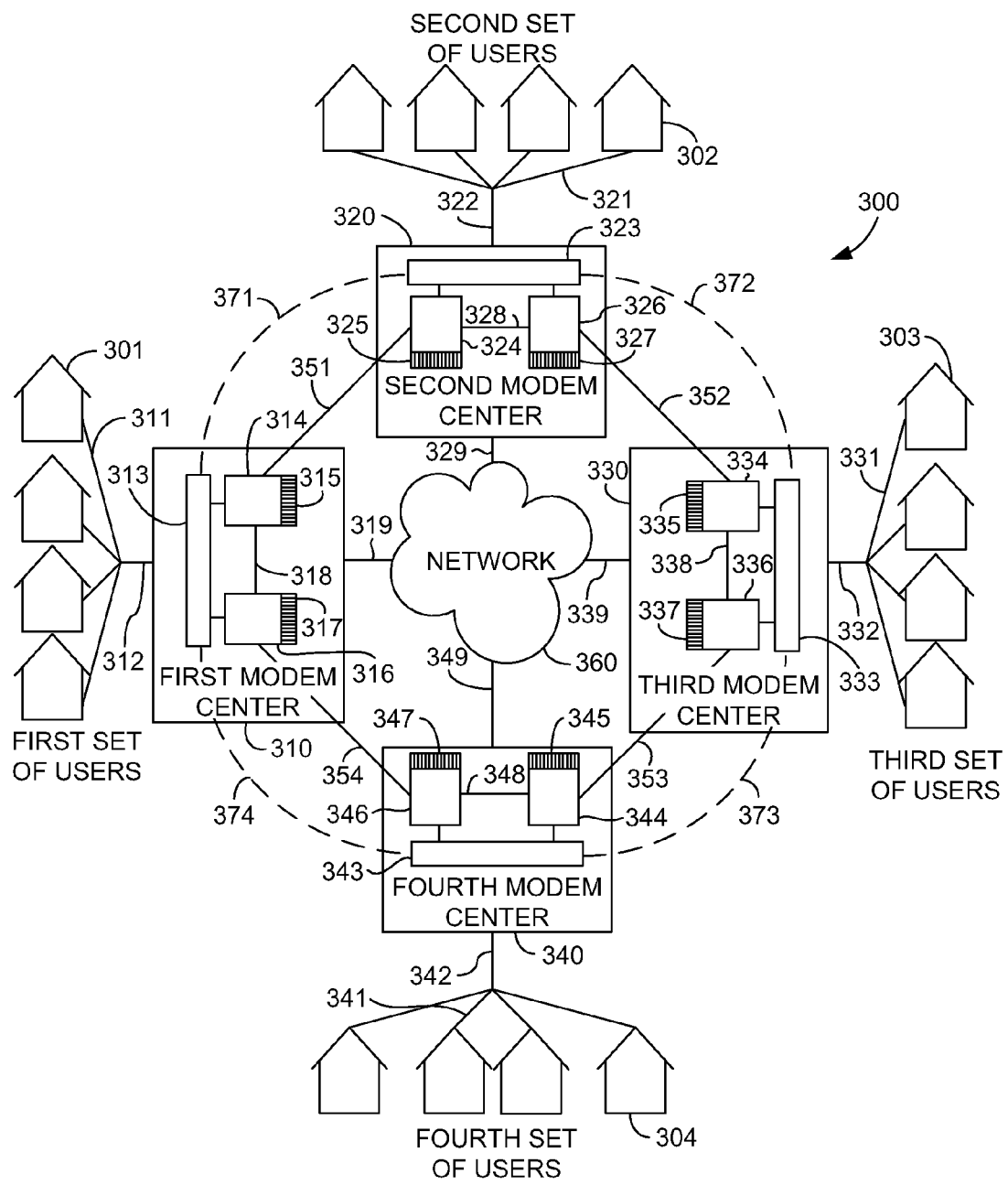
FIG. 3 illustrates a schematic view of a system for routing incoming dial-up modem calls amongst numerous modem centers, each containing multiple data tandems.

Referring now to FIG. 3, a system 300 in accordance with the present invention is illustrated. While any number of modem centers may be used with the present invention, FIG. 3 illustrates a first modem center 310, a second modem center 320, a third modem center 330, and a fourth modem center 340. A first set of users 301 connect to the Internet via dial-up modem to the first modem center 310. A second set of users 302 connect to the Internet via dial-up modem to the second modem center 320. A third set of users 303 connect to the Internet via dial-up modem to the third modem center 330. A fourth set of users 304 connect to the Internet via dial-up modem to the fourth modem center 340.

The present invention may be implemented using data tandems to query for an available modem. A data tandem is a telecommunication device that combines a signaling gateway, such as an SS7 call signaling gateway, with trunking gateway. A data tandem may comprise a single physical unit or may comprise multiple devices that operate together. A single SS7 call signaling gateway may operate with multiple trunking gateways.

The first modem center 310 includes the first trunking gateway 314 controls one or more remote access servers (RASes) 315. The second trunking gateway 316 controls one or more remote access servers 317. The SS7 signaling gateway 313 associated with the first modem center 310 may be physically within or outside the first modem center 310. The SS7 signaling gateway 313 signals the first trunking gateway 314 and the second trunking gateway 316 within the first modem center 310 when an incoming call needs to be received. SS7 signaling gateway 313 will ultimately route a call to an available modem. Users 301 who are attempting to connect to the Internet via a dial-up modem and a connection to the first modem center 310 do so via telephone lines 311. The telephone lines 311 ultimately combine into one or more trunks 312 that connect to the first modem center 310. It should be understood that the telephone lines and trunks illustrated in conjunction with each modem center in FIG. 3 are illustrative only and are not indicative of the numbers of telephone lines or trunks to be used in any particular application of the invention.

The second modem center 320 also includes two data tandems formed from a signaling gateway 323 that operates with a first trunking gateway 324 and a second trunking gateway 326. The first trunking gateway 324 controls one or more remote access servers 325. The second trunking gateway 326 controls one or more remote access servers 327. The SS7 signaling gateway 323 associated with the second modem center 320 may be physically within or outside the second modem center 320. The SS7 signaling gateway 323 signals the first trunking gateway 324 and the second trunking gateway 326 within the second modem center 320 when a call needs to be received. Users 302 who are attempting to connect to the Internet via a dial-up modem and a connection to the second modem center 320 do so via telephone lines 321. The telephone lines 321 ultimately combine into one or more trunks 322 that connect to the second modem center 320.

The third modem center 330 also includes two data tandems formed from a signaling gateway 333 that operates with a first trunking gateway 334 and a second trunking gateway 336. The first trunking gateway 334 controls one or more remote access servers 335. The second trunking gateway 336 controls one or more remote access servers 337. The SS7 signaling gateway 333 associated with the third modem center 330 may be physically within or outside the second modem center 330. The SS7 signaling gateway 323 signals the first trunking gateway 334 and the second trunking gateway 336 within the third modem center 330 when a call needs to be received. Users 303 who are attempting to connect to the Internet via a dial-up modem and a connection to the third modem center 330 do so via telephone lines 331. The telephone lines 331 ultimately combine into one or more trunks 332 that connect to the third modem center 330.

The fourth modem center 340 also includes two data tandems formed from a signaling gateway 343 that operates with a first trunking gateway 344 and a second trunking gateway 346. The first trunking gateway 344 controls one or more remote access servers 345. The second trunking gateway 346 controls one or more remote access servers 347. The SS7 signaling gateway 343 associated with the fourth modem center 340 may be physically within or outside the fourth modem center 340. The SS7 signaling gateway 343 signals the first trunking gateway 344 and the second trunking gateway 346 within the fourth modem center 340 when a call needs to be received. Users 304 who are attempting to connect to the Internet via a dial-up modem and a connection to the fourth modem center 340 do so via telephone lines 341. The telephone lines 341 ultimately combine into one or more trunks 342 that connect to the fourth modem center 340.

In FIG. 3 the modem centers are linked using dedicated connections. More particularly, the first modem center 310 and the second modem center 320 are linked by a dedicated connection 351, the second modem center 320 and the third modem center 330 are linked by a dedicated connection 352, the third modem center 330 and the fourth modem center 340 are linked by a dedicated connection 353, and the fourth modem center 340 and the first modem center 310 are linked by a dedicated connection 354. The first SS7 signaling gateway 313 connects to the second SS7 signaling gateway 323 using a first network connection 371. The second SS7 signaling gateway 323 connects to the third SS7 signaling gateway 333 using a second network connection 372. The third SS7 signaling gateway 333 connects to the fourth SS7 signaling gateway 343 using a third network connection. The fourth SS7 signaling gateway 343 connects to the first SS7 signaling gateway 313 using a fourth network connection 373. The first network connection 371, the second network connection 372, the third network connection 373, and the fourth network connection 374 may be connections established using existing telephony networks. Additional network connections beyond those illustrated in FIG. 3 may be employed. Each modem center also acts as a gateway to a network 360. The network 360 may, for example, be the internet. The remote access server that receives a call operates as a modem and converts between the circuit based connection with the user and the digital signaling required for the network 360. The first modem center 310 connects to network 360 by a connection 319, the second modem center 320 connects to the network 360 by a connection 329, the third modem center 330 connects to the network 360 by a connection 339, and the fourth modem center 340 connects to the network 360 by a connection 349.

Those skilled in the art will appreciate that FIG. 3 broadly illustrates but one embodiment of the present invention. While FIG. 3 shows four modem centers, the present invention may be implemented with two or more modem centers. FIG. 3 illustrates each modem center as including two data tandems, while fewer or more data tandems may be used at a particular modem center. FIG. 3 illustrates data tandems with separate signaling gateway and trunking gateway components. A data tandem may also comprise a single physical unit that performs both signaling gateway and trunking gateway functions. If data tandems comprise separate signaling gateway and trunking gateway components, a single signaling gateway may operate with any number of trunking gateways, depending only upon the functional limitations of the signaling gateway used. Alternatively, multiple signaling gateways may be used, for example to provide redundancies to enhance system stability. If data tandems comprise separate signaling gateway and trunking gateway components, the signaling gateway may be located either within or outside the modem center. Moreover, different modem centers may include differing numbers of data tandems, remote access servers, and modems. With these general and particular observations in mind, further aspects of FIG. 3 should be considered.

When one of the users 301 seeks to connect to the Internet via a dial-up connection to modem center 310, that user 301 uses a modem to place a call via telephone line 311 which connects to the first modem center 310 via a trunk 312. SS7 signaling gateway 313 seeks to route the call to a remote access server controlled by a trunking gateway, such as the first trunking gateway 314. The trunking gateway 314 of the data tandem queries the remote access servers 315 the first trunking gateway 314 controls to determine whether one of the remote access servers 315 has an available modem to receive the call. If none of the remote access servers 315 have an available modem, the SS7 signaling gateway 313 of the data tandem may seek to route the call to a remote access server 317 controlled by the second trunking gateway 316. It should be noted that the first modem center contains two data tandems. The first data tandem comprises the SS7 signaling gateway 313 and the first trunking gateway 314. The second data tandem comprises the SS7 signaling gateway and the second trunking gateway 316. A data tandems whether comprised of separate signaling gateway and trunking gateway components or comprising a single unit, may be thought of as either local or remote. As used herein, the term "local data tandem" refers to a data tandem located in the same modem center as the data tandem to which a call was initially directed, while the term "remote data tandem" refers to a data tandem located in a different modem center than the data tandem to which the call was initially directed. The trunking gateway 316 of the second data tandem then queries the remote access servers 317 the second trunking gateway 316 controls for an available modem. If the second trunking gateway 316 does not have a remote access server 317 with an available modem, the SS7 signaling gateway of the second data tandem 316 signals the first data tandem 314 that it has no modems available.

The SS7 signaling gateway 314 of the first data tandem then signals the second modem center 320 via network connection 371 for an available modem. In response to the query, the SS7 signaling gateway 323 of the second modem center 320 queries the first trunking gateway 324, and the first trunking gateway 324 of the first data tandem of the second modem center 320 queries its associated remote access servers 325 for an available modem. If none of the remote access servers 325 controlled by the first trunking gateway 324 of the second modem center 320 has an available modem, the SS7 signaling gateway 323 of the queries the second trunking gateway 326 of the second modem center 320 for an available modem. The trunking gateway 326 of the second data tandem then queries the remote access servers 327 associated with it for an available modem. If either the first data tandem or the second data tandem of the second modem center 320 has a remote access server associated with it that possesses an available modem, that SS7 signaling gateway 323 of that data tandem signals via the network connection 371 to SS7 signaling gateway 313 as to the location of the available modem. The SS7 signaling gateway 313 of the first data tandem of the first modem center 310 then routes the call to the available modem in the second modem center 320 via the dedicated connection 351.

If, however, no modem is available in the second modem center 320, then the SS7 signaling gateway 323 of the first data tandem of the second modem center 320 queries the SS7 signaling gateway 333 of the third modem center 330 via network connection 372 for an available modem. The SS7 signaling gateway 333 queries the trunking gateway 334 of the first data tandem. When queried, the trunking gateway 334 of the first data tandem of the third modem center 330 queries the remote access servers 335 associated with it for an available modem. If none of the remote access servers 335 associated with the first trunking gateway 334 has an available modem, the SS7 signaling gateway 333 queries the second trunking gateway 336 of the third modem center 330. The trunking gateway 336 of the second data tandem then queries the remote access servers 337 associated with it for an available modem. If either the first data tandem or the second data tandem of the third modem center 330 has a remote access server associated with it that possesses an available modem, the SS7 signaling gateway 333 of the third modem center 330 signals via network connection 372 the SS7 signaling gateway 323 of the second modem center 320, which in turn signals the SS7 signaling gateway 313 of the first modem center 310 via network connection 371, to identify the available modem. The SS7 signaling gateway 313 of the first modem center 310 then routes the dial-up modem call to that available modem in the third modem center 330 via dedicated connection 351 and dedicated connection 352.

If no modem is available in the first modem center 310, the second modem center 320, or the third modem center 330, the fourth modem center 340 may also be queried for a modem. The SS7 signaling gateway 334 of the first data tandem of the third modem center 330 queries the SS7 signaling gateway 344 of the fourth modem center 340 via network connection 373. The SS7 signaling gateway 343 queries the trunking gateway 344 of the first data tandem. The trunking gateway 344 of the first data tandem of the fourth modem center 340 then queries the remote access servers 345 associated with it for an available modem. If none of the remote access servers 345 associated with the first data tandem possesses an available modem, the SS7 signaling gateway 343 of the first data tandem 344 queries the trunking gateway 346 of the second data tandem of the fourth modem center 340. The trunking gateway 346 of the second data tandem then queries the remote access servers 347 associated with it for an available modem. If neither the first data tandem nor the second data tandem of the fourth modem center 340 possess an available modem, additional modem centers (not shown) can be queried for an available modem. Alternatively, a busy signal can be returned to the caller, indicating that no modems are available and that the dial-up connection should be attempted again at a later time. Often, local switches such as SS7 signaling gateway 313 include timers that will transmit a busy signal if a call cannot be routed within a predetermined time.

Those skilled in the art will appreciate that numerous changes can be made to the system 300 illustrated in FIG. 3 without departing from the scope of the present invention. For example, the number of modem centers can vary from that shown in FIG. 3. Likewise, the number of modem centers queried before returning a busy signal can vary. For example, if the querying process is time consuming, timers at the local switch level will result in transmitting a busy signal before multiple modem centers can be queried, making it pointless to query additional data tandems after a timer has expired. The number of data tandems shown in the modem centers can vary from what is illustrated in FIG. 3. A modem center may contain only a single data tandem and still function properly. In such a case, if that data tandem could not obtain a modem through a remote access server that it controls it would immediately query a remote data tandem in another modem center for an available modem. Also, more than two data tandems may be included in a single modem center. In this case, additional queries could be made to the local data tandems in that modem center before querying remote data tandems in a different modem center for an available modem. Data tandems may comprise multiple trunking gateways that operate with a single signaling gateway, as shown in FIG. 3, or may comprise single trunking gateway that operates with a single signaling gateway. Of course, the reference to a particular modem center, data tandem, or other component of system 300 is for illustrative purposes only. The system 300 performs effectively no matter which modem center and data tandem initially receives a call.

Different modem centers may be geographically remote from one another in accordance with the present invention. In this sense, geographically remote indicates that sufficient physical distance separates modem centers that local characteristics impacting dial-up Internet call volume that apply in one modem center's calling area do not typically apply at the same time and to the same degree in geographically remote modem center's calling area. For example, modem centers may be located in different time zones. In FIG. 3, the first modem center 310 could be located in the Eastern time zone, the second modem center 320 could be located in the Central time zone, the third modem center 330 could be located in the Mountain time zone, and the fourth modem center 340 could be located in the Pacific time zone. Of course, the present invention may be configured in other ways as well. For example, the system may include only a first modem center 310 and a second modem center 320, with the modem centers being located more than one time zone apart, such as the first modem center 310 being in the Eastern time zone and the second modem center 320 being in the Pacific time zone. The order of designating modem centers is also irrelevant. The first modem center 310 could be in the Eastern time zone, the second modem center 320 in the Mountain time zone, the third modem center 330 in the Central time zone and the fourth modem 340 center in the Pacific time zone. Indeed, it can be advantageous for a modem center seeking a modem during peak usage to first seek a modem from a modem center more distant than a single time zone, as a more distant modem center may be less likely to be experiencing a local peak in Internet usage.

In accordance with the present invention, modem centers and the associated data tandems can be either local or remote. For example, in FIG. 3 the first data tandem comprises SS7 signaling gateway 313 and trunking gateway 314. Also in the first modem center 310 the second data tandem comprises SS7 signaling gateway 313 and trunking gateway 314. As both the first data tandem and the second data tandem are located in the first modem center each is a local data tandem relative to the other. The remaining data tandems in the other modem centers are remote from the first data tandem 314. Generally speaking, a call directed to a particular modem center or data tandem within a modem center should be received by that data tandem or a local data tandem to avoid the additional carrier costs of connecting the call to a remote data tandem through one or more network connections. However, at a certain point the cost of maintaining additional local modems to meet peak dial-up demands exceeds the costs of connecting overflow calls to remote data tandems through the telephony network connections. The present invention allows remote modems to meet local demand peaks to the degree desired by an ISP and allows an ISP to grow its subscriber base in a particular locale without having to immediately increase the number of modems locally available to accommodate increased local modem demands.

Figure 4A:
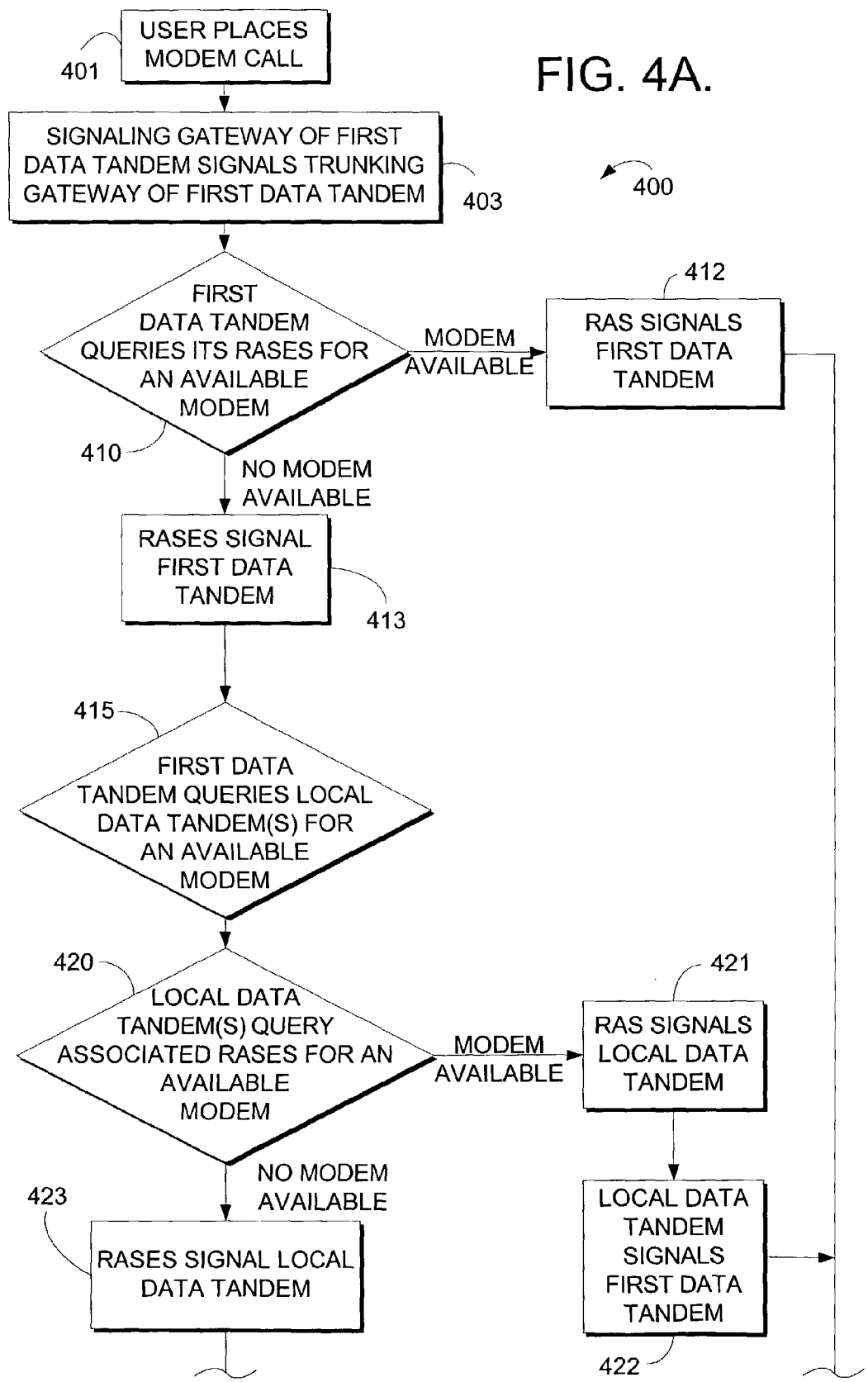
FIG. 4A and FIG. 4B illustrate a method whereby an incoming dial-up modem call is routed to an available ISP modem.
Figure 4B:
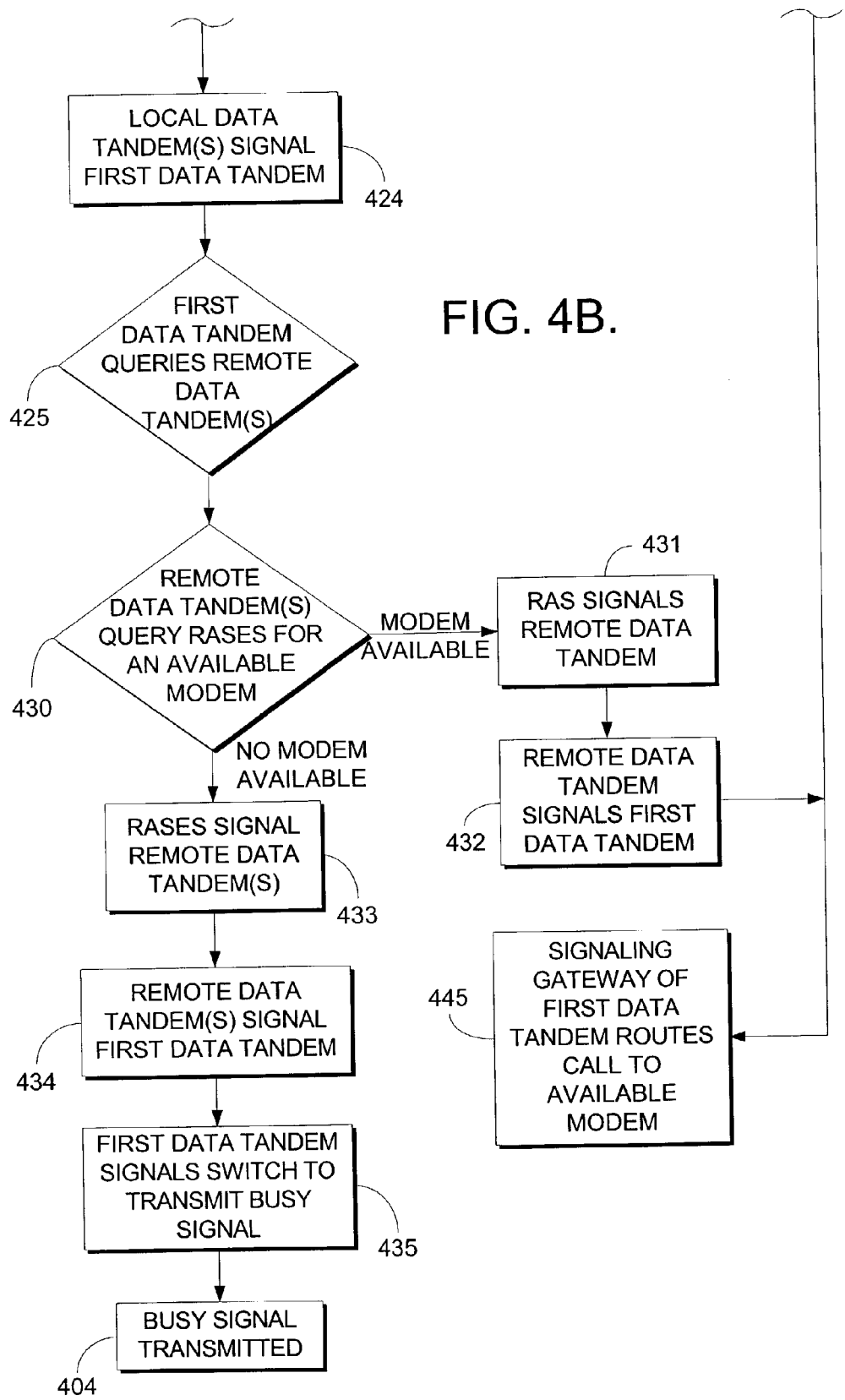

Referring now to FIG. 4A and FIG. 4B, a method 400 in accordance with the present invention is illustrated. The method 400 begins with step 401 when a user places a dial-up modem call. When the call is placed in step 403 the signal gateway of the first data tandem signals the trunking gateway of the first data tandem that a modem call needs to be received. The trunking gateway of the first data tandem then queries its associated remote access servers (RASes) for an available modem in step 410. If a modem is available, the remote access server (RAS) with an available modem signals the first data tandem accordingly in step 412.

If no modem is available, the remote access servers (RASes) signal the first data tandem accordingly in step 413. To signal a data tandem, the remote access servers (RASes) may signal the data tandem's trunking gateway, which then signals the data tandem's signaling gateway. The SS7 signaling gateway of the first data tandem next queries local data tandems for an available modem in step 415. If there are no local data tandems to query, method 400 proceeds to step 425, discussed below. In step 420 the trunking gateways of the local data tandems query their associated remote access servers (RASes) for an available modem. If a modem is available, the remote access server (RAS) with an available modem signals the local data tandem accordingly in step 421. The signaling gateway of the local data tandem then signals the first data tandem of the available modem in step 422. It should be noted that if a single signaling gateway operates with multiple trunking gateways the same signaling gateway may be a part of all local data tandem. In this instance, step 422 may be wholly or partially omitted.

If no modem is available, the remote access servers (RASes) signal the local data tandem accordingly in step 423. The signaling gateway of the local data tandem then signals the first data tandem that no modems are available in step 424. The signaling gateway of the first data tandem then queries remote data tandems for an available modem in step 425. The step 425 of querying remote data tandems can include querying multiple remote data tandems in multiple modem centers, either directly or through intermediate data tandems. After being queried by the first data tandem, the signaling gateway of the remote data tandem queries the remote data tandem's trunking gateway, and the trunking gateway of a remote data tandem queries its associated remote access servers for an available modem in step 430. If a modem is available, the remote access server with an available modem signals the remote data tandem as to the identity and availability of a modem in step 431. The signaling gateway of the remote data tandem then signals the signaling gateway of the first data tandem as to the identity and availability of the available modem in step 432.

If no modems are available from a remote access server controlled by a remote data tandem, the remote access servers then signal the remote data tandem that no modems are available in step 433. The signaling gateways of the remote data tandems then signal the first data tandem that they have no modems available in step 434. The signaling gateway of the first data tandem then transmits a busy signal in step 435. A busy signal is transmitted to the caller in step 404. If at some point during the process 400, the first data tandem has been signaled that a modem is available, for example in step 412, step 422, or step 432, the signaling gateway of the first data tandem connects the call to the available modem in step 445. The switch then routes the call to the available modem in step 405. It should be noted that for purposes of routing the call by the switch there is no difference between connecting the call to a local modem or a remote modem. While there may be network access costs associated with routing a call to a remote modem, the switch itself operates in the same fashion regardless of where a call is to be routed.

Figure 5:
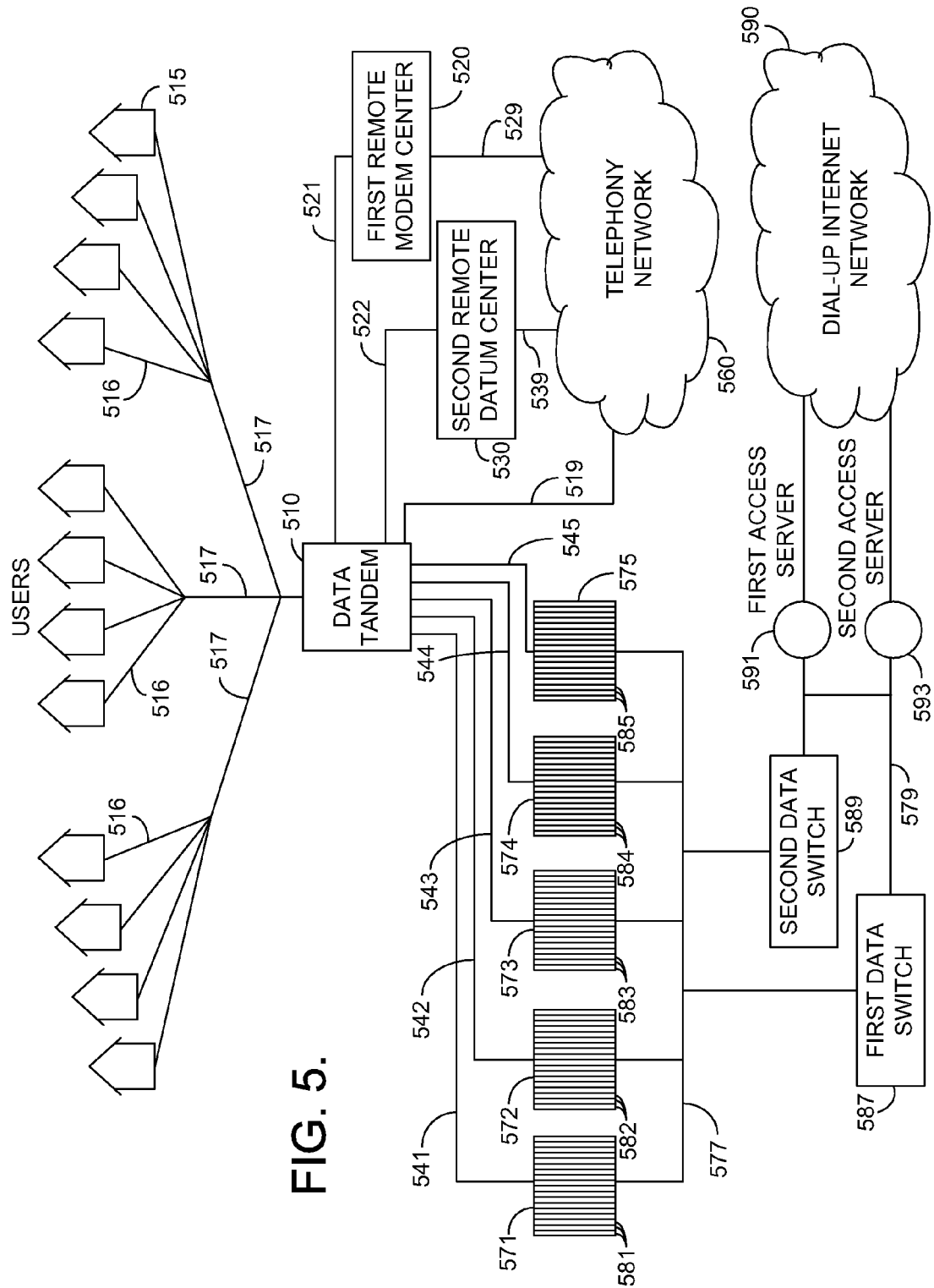
FIG. 5 illustrates a data tandem and remote access server system in accordance with the present invention.

Referring now to FIG. 5, the components of a modem center are shown schematically, as well as some of the external connections from the modem center. The modem center includes a data tandem 510. The data tandem 510 routes calls to the first remote modem center 520 via a dedicated connection 521. The data tandem 510 routes calls to the second remote modem center 530 via a dedicated connection 522. The first remote modem center 520 connects to the telephony network 560 via a connection gateway 529. The second remote modem center 530 connects to the telephony network 560 via a gateway connection 539. The data tandem 510 connects to the telephony network 560 via a gateway connection 519. The signaling gateway of the data tandem 510 forms a network connection with the signaling gateway of a remote data tandem through telephony network 560. Users 515 use modems to form dial-up connections to access the Internet using data tandem 510 via telephone lines 516 that combine to form trunks 517. A first switch 540 and a redundant switch 542 are provided to route calls and to signal data tandem 510 when a call needs to be received. While redundant switch 542 need not be provided, fault tolerance redundancies such as this are frequently employed in telecommunications and, accordingly, redundant switch 542 is illustrated in FIG. 5. Data tandem 510 controls a plurality of associated remote access servers. In FIG. 5 a first remote access server 571, a second remote access server 572, a third remote access server 573, a fourth remote access server 574, and a fifth remote access server 575 are illustrated, although the specific number of remote access servers associated with data tandem 510 is immaterial to the present invention. The first remote access server 571 is connected to data tandem 510 via a link 541 and controls a plurality of modems 581. The second remote access server 572 is connected to data tandem 510 via a link 542 and controls a plurality of modems 582. The third remote access server 573 is connected to data tandem 510 via a link 543 and controls a plurality of modems 583. The fourth remote access server 574 is connected to data tandem 510 via a link 544 and controls a plurality of modems 584. The fifth remote access server 575 is connected to data tandem 510 via a link 545 and controls a plurality of modems 585. A call placed by a user 515 connects via trunk 517 to data tandem 510. The trunking gateway of data tandem 510 queries its associated remote access servers for an available modem. Once an available modem is identified, for example in the first remote access server 571, the call is routed by the signaling gateway of the data tandem 510 to the available modem in the plurality of modems 581 via link 541. The modem then converts the circuit-based connection between the user and the modem to a packet-based signal appropriate for connection to the Internet. While one skilled in the art will realize that numerous methods of connecting those signals to the internet are possible, the packet-based signal may be connected to first data switch 587 or a second data switch 589 via a digital connection 577. After switching, the connection is made via a digital connection 579 to a first access server 591 or a second access server 593, which connect to the dial-up Internet network 590. If data tandem 510 cannot obtain an available modem from its associated remote access servers, its signaling gateway queries the first remote modem center 520 via a network connection through network 560 for an available modem. If an available modem cannot be obtained in the first remote modem center 520, the signaling gateway of data tandem 510 then queries the second remote modem center 530 via a network connection through network 560 for an available modem. If an available modem is identified in either the first remote modem center 520 or second remote modem center 530, the signaling gateway of data tandem 520 connects the call to the available modem via either dedicated connection 521 or dedicated connection 522.

Figure 6A:
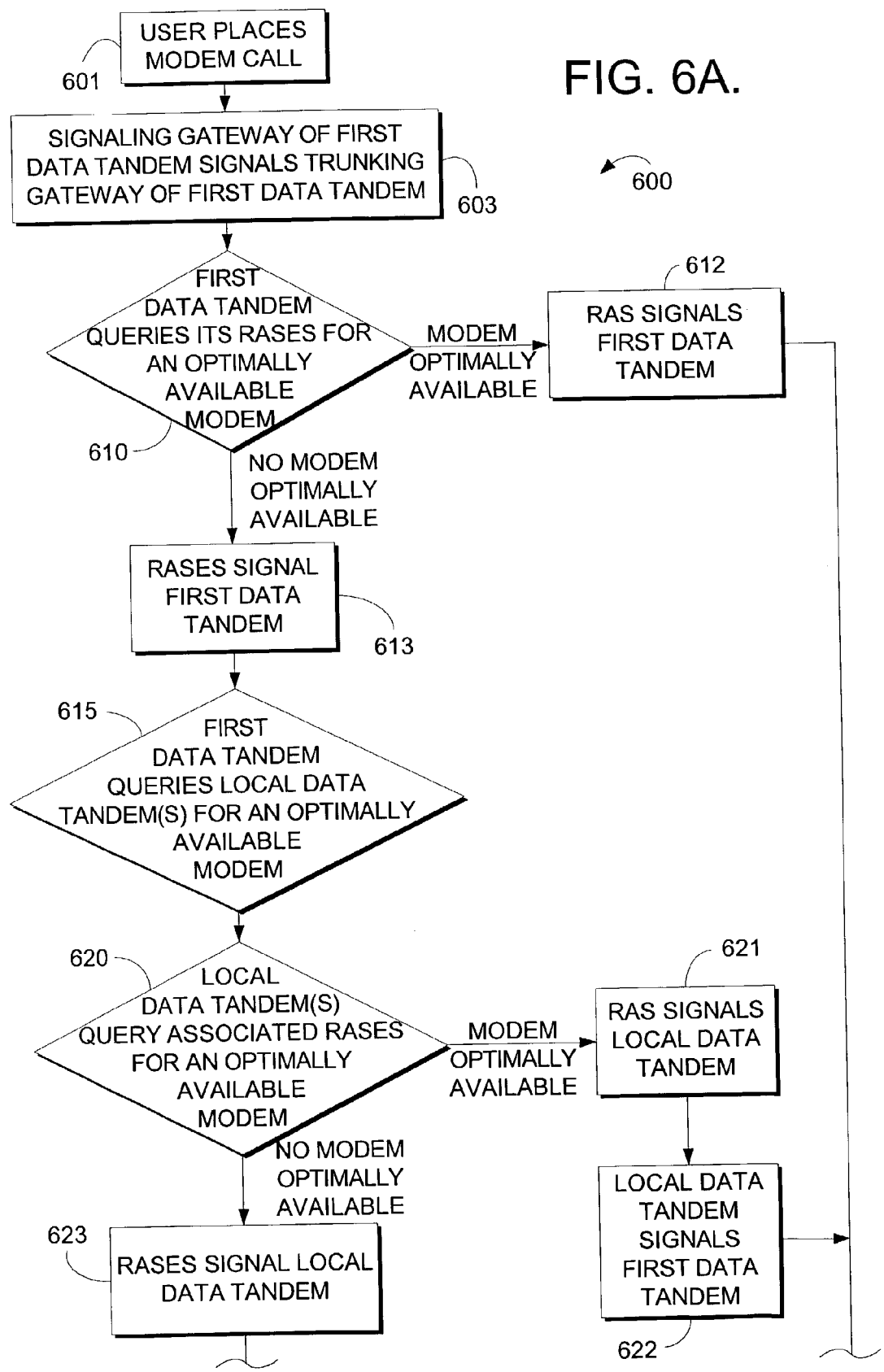
FIG. 6A and FIG. 6B illustrate a method whereby a dial-up modem call is routed to an available modem while optimizing modem performance.
Figure 6B:
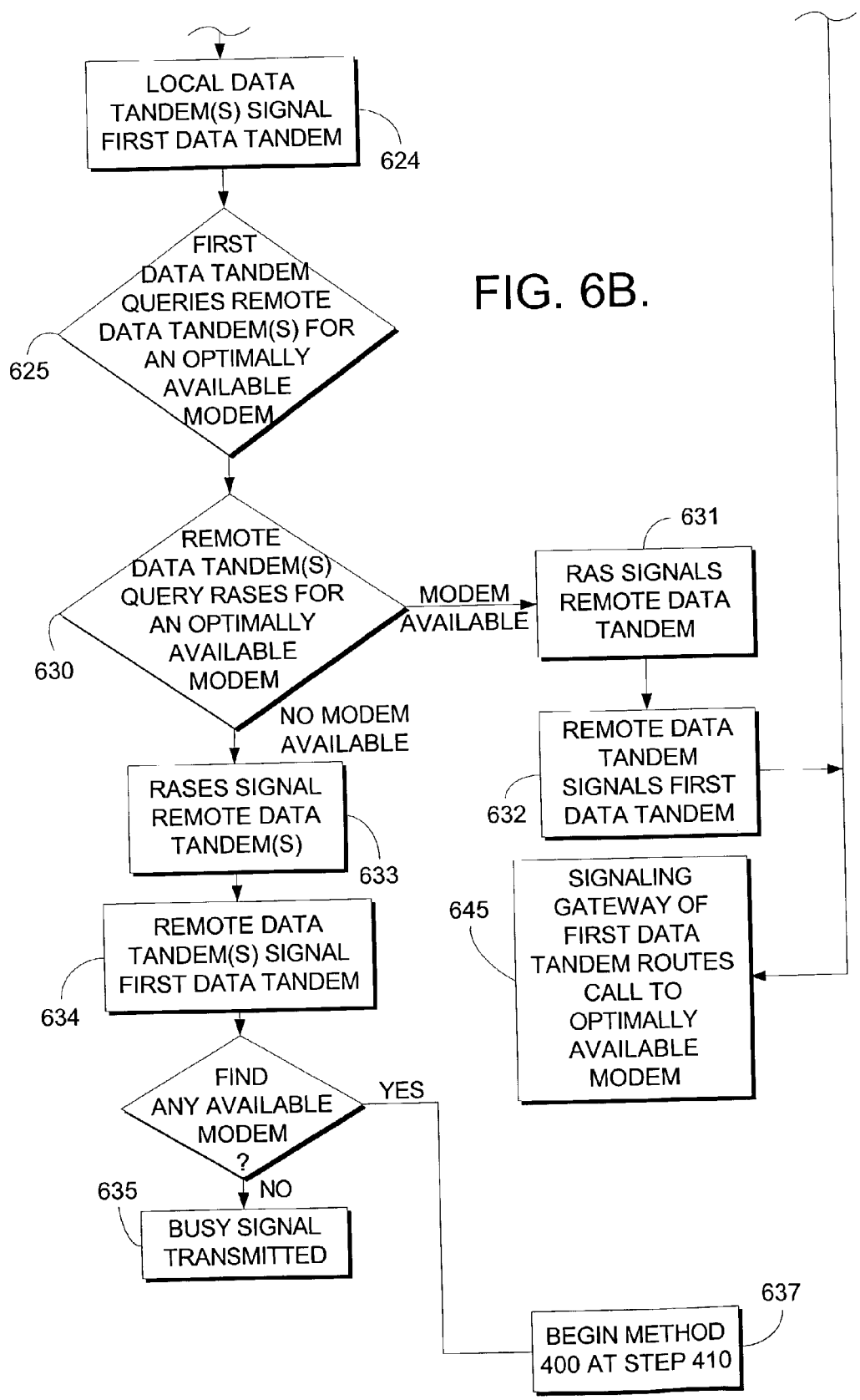

Referring now to FIG. 6, a method 600 in accordance with the present invention for optimizing modem performance in the routing of dial-up modem calls is illustrated. The method 600 optimizes modem performance by routing calls to optimally available modems. An optimally available modem is a modem to which the call can be connected without impairing overall modem performance. For example, as the percentage of modems associated with a remote access server (RAS) increases, the incidents of dropped calls, hanging modems, and unacceptably slow modem performance increases. The percentage of modems that can optimally be used on a remote access server (RAS) will vary depending upon the age, construction, and type of remote access server (RAS). In determining whether a call can optimally be received by a remote access server (RAS), the data tandem executes instructions that are appropriate for a particular remote access server (RAS) and optimizes call routing for the remote access server (RAS) associated with it. For example, a particular remote access server (RAS) may experience performance degradation if more than ninety-five percent of its modems are in use. Therefore, if the usage of modems with that remote access server (RAS) exceeds the threshold value of ninety-five percent usage, that remote access server (RAS) does not possess an optimally available modem. The threshold value may be set differently for different types of remote access servers (RASes). Method 600 for optimizing the routing of a modem call begins when a user places a modem call 601. The signaling gateway of the first data tandem then signals the trunking gateway of the first data tandem that a call needs to be received 603. The trunking gateway of the first data tandem then queries its associated remote access servers for an optimally available modem 610.

If a remote access server (RAS) associated with the first data tandem has an optimally available modem, the remote access server (RAS) signals the first data tandem as to the availability of this modem in step 612. If the remote access servers (RASes) associated with the first data tandem do not possess an optimally available modem, the remote access servers (RASes) signal the first data tandem accordingly in step 613. The signaling gateway of the first data tandem then queries local data tandems for an optimally available modem in step 615. The trunking gateways of the local data tandems then, in turn, query their associated remote access servers (RASes) for an optimally available modem in step 620. If a local data tandem has a remote access server (RAS) associated with it that has an optimally available modem, that remote access server (RAS) signals the local data tandem with which it is associated in step 621. The signaling gateway of the local data tandem then signals the first data tandem as to the availability of an optimally available modem in step 622. If no remote access servers (RASes) possess an optimally available modem, the remote access servers (RASes) signal the local data tandems accordingly in step 623. The signaling gateway of the local data tandems then signal the first data tandem that they do not possess an optimally available modem in step 624. The signaling gateway of the first data tandem then queries remote data tandems for an optimally available modem in step 625. The trunking gateways of the remote data tandems in turn query their associated remote access servers (RASes) for an optimally available modem in step 630. If a remote access server (RAS) possesses an optimally available modem, the remote access server (RAS) signals its associated data tandem accordingly in step 631. The signaling gateway of the remote data tandem then signals the first data tandem as to the available modem in step 632. If none of the queried remote access servers (RASes) possess an optimally available modem, the remote access servers (RASes) signal their associated remote data tandems accordingly in step 633. The signaling gateways of the remote data tandems then signal the first data tandem that they do not possess an optimally available modem in step 634. If a modem has been identified that is optimally available, for example in step 612, step 622, or step 632, the signaling gateway of the first data tandem routes the call to the optimally available modem in step 645. If the method 600 does not identify an optimally available modem, the method 600 may continue with the signaling gateway of the first data tandem transmitting a busy signal in step 635. The method 600 may alternatively continue with step 637 to find any available modem by beginning the method 400 illustrated in FIG. 4A and FIG. 4B begins at step 410, wherein the first data tandem queries its associated remote access servers (RASes) for an available modem to determine whether a modem is available to receive the call, even if that call cannot be optimally received. In this way, the system seeks to first connect a modem call optimally so as to maintain optimal modem performance and, if that cannot be accomplished, the system then seeks to connect the call to any available modem.

Alternatively, method 600 for optimizing modem load allocation can operate in parallel with method 400 of identifying an available modem. For example, a query for an available modem and a query for an optimally available modem may be combined. In such an embodiment, the system would route a call to an available, but not optimally available, modem if queries failed to identify an optimally available modem associated with another data tandem. Other combinations of method 600 for optimizing modem load allocation and method 400 of identifying an available modem may also be employed. For example, a call could be routed to a data tandem in a remote modem center only if that modem is optimally available, while routing a call to local data tandems may be strictly on the basis of whether a modem is available.

As explained above, the present invention provides a system and method for allocating dial-up internet access modem telephone calls among at least two geographically remote modem centers. The system and method in accordance with the present invention allows calls that exceed the capacity of a local modem center to route the calls to a geographically distant modem center. The invention may also be used to optimize the routing of dial-up internet access modem telephone calls to avoid overloading ISP modem resources. While the present invention has been described in relation to particular embodiments, which are intended to be illustrative rather than restrictive, alternative embodiments that do not depart from the scope of the present invention will be apparent to those skilled in the art. It will be understood that certain features and subcombinations are of utility and may be employed without reference to other features and subcombinations and are contemplated within the scope of the claims. Not all of the steps listed in the various figures need be carried out in the specific order described, and some steps may be combined.

What is claimed is:

1. A method for providing dial-up Internet access wherein incoming modem calls may be allocated among a plurality of modem centers in a plurality of time zones, the method comprising:
   determining whether a first modem center can receive a call, wherein the call is a dial-up call placed by a user on a circuit-based connection that is local to a first modem center;
   if the first modem center cannot receive the call, identifying a second modem center to receive the call, wherein identifying comprises:
      (1) initially identifying a geographic region that is geographically remote from, and in a separate time zone than, the first modem center such that local peak usage times impacting the dial-up Internet call volume that apply in a calling area of the first modem center do not apply to modem centers in the geographic region; and
      (2) querying the modem centers to identify the second modem center therein that is available to receive the call; and
   if it is determined that the second modem center can receive the call, establishing a connection to the second modem center over a dedicated connection between the second modem center and the first modem center, wherein the second modem center converts the circuit-based connection to digital signaling and routes the digital signal to a network.

2. The method of claim 1, further comprising the steps of:
   identifying a third modem center as being geographically remote from the second modem center; and
   if the first modem center and the second modem center cannot receive the call, determining whether a third modem center can receive the call; and
   if so, establishing a connection to the third modem center.

3. The method of claim 2, wherein each of the plurality of modem centers comprises at least one data tandem and wherein the steps of:
   determining whether the second modem center in the second time zone can receive the call comprises the data tandem in the first modem center querying the data tandem in the second modem center for an available modem; and
   determining whether the third modem center in the third time zone can receive the call comprises the data tandem in the second modem center querying the data tandem in the third modem center for the available modem.

4. The method of claim 2, wherein the step of establishing a connection to the third modem center comprises using a signaling gateway of the data tandem of the first modem center to direct the call to the third modem center over a telephony network.

5. The method of claim 1, wherein each of the plurality of modem centers comprises at least one data tandem and wherein the step of determining whether the second modem center in the second time zone can receive the call comprises the data tandem in the first modem center querying the data tandem in the second modem center for an available modem.

6. The method of claim 1, wherein the step of establishing a connection to the second modem center comprises using a signaling gateway of the data tandem of the first modem center to direct the call to the second modem center over a telephony network.

7. A method for routing an incoming dial-up internet access modem call comprising the steps of:
   establishing a first modem center and a second modem center, wherein establishing a connection to the first modem center incurs local carrier costs while establishing a connection to the second modem center, incurs costs in additional the local carrier costs;

determining whether the first modem center can receive the incoming dial up internet access modem call;

if the first modem center cannot receive the call, determining whether the second modem center can receive the incoming dial up internet access modem call, wherein determining comprises:

(1) initially identifying a geographic region that is geographically remote from, and in a separate time zone than, the first modem center such that local peak usage times impacting the dial-up Internet call volume that apply in a calling area of the first modem center do not apply to modem centers in the geographic region (2) querying a plurality of the modem centers to identify the second modem center of the modem centers that is available to receive the call based on a threshold value of usage of modems, wherein the threshold value is established according to a percent usage of modems at each of the modem centers at which performance degradation occurs; and (3) receiving an indication from the second modem center of its identity and availability over a network connection; and establishing a connection over a dedicated connection between the first modem center and the second modem center if the first modem center cannot receive the incoming dial up internet access modem call and the second modem center can receive the incoming dial up internet access modem call.

8. The method of claim 7 further comprising the steps of:

establishing a third modem center, wherein the third modem center is identified as being geographically remote from the first modem center and the second modem center, wherein establishing a connection to the third modem center incurs costs in additional the local carrier costs;

if the first modem center and the second modem center cannot receive the incoming dial up internet access modem call, determining whether the third modem center can receive the incoming dial up internet access modem call; and establishing a connection to the third modem center if the first modem center and the second modem center cannot receive the incoming dial up internet access modem call and the third modem center can receive the incoming dial up internet access modem call.

9. The method of claim 8 wherein the first modem center is established in a first time zone, the second modem center is established in a second time zone, and the third modem center is established in a third time zone.

10. The method of claim 8 wherein the steps of establishing the first modem center, establishing the second modem center, and establishing the third modem center comprise:

providing in each modem center a first data tandem, the first data tandem comprising a signaling gateway and a trunking gateway; and providing a plurality of remote access servers controlled by the trunking gateway of the first data tandem, each remote access server possessing a plurality of modems.

11. The method of claim 10 wherein the steps of establishing the first modem center, establishing the second modem center, and establishing the third modem center further comprises:

providing in each modem center a second data tandem, the second data tandem comprising a signaling gateway and a trunking gateway; and providing a plurality of remote access servers controlled by the trunking gateway of the second data tandem, each remote access server possessing a plurality of modems.

12. The method of claim 11, wherein the step of determining whether the first modem center can receive the incoming dial up internet access modem call comprises:

signaling the trunking gateway of the first data tandem that a call needs to be received;

querying the remote access servers controlled by the first data tandem to determine whether one of the remote access servers possesses a modem that can receive the call;

if none of the first data tandem's remote access servers possess a modem that can receive the call, querying the second data tandem for an available modem; and querying the remote access servers controlled by the second data tandem to determine whether one of the remote access servers possesses a modem that can receive the call.

13. The method of claim 12, wherein the step of determining whether the second modem center can receive the call comprises:

the signaling gateway of the first data tandem of the first modem center querying the signaling gateway of the first data tandem of the second modem center for the available modem;

the trunking gateway of the second modem center's first data tandem querying the remote access servers controlled by the first data tandem to determine whether one of the remote access servers possesses a modem that can receive the call;

if none of the second modem center's first data tandem's remote access servers possess a modem that can receive the call, the signaling gateway of the second modem center's first data tandem querying the signaling gateway of the second modem center's second data tandem for the available modem; and the trunking gateway of the second modem center's second data tandem querying the remote access servers controlled by the second data tandem to determine whether one of the remote access servers possess a modem that can receive the call.

14. The method of claim 13 wherein the step of establishing a connection to the second modem center if the first modem center cannot receive the incoming dial up internet access modem call and the second modem center can receive the incoming dial up internet access modem call comprises:

the signaling gateway of the second modem center's first data tandem signaling the signaling gateway of the first modem center's first data tandem identifying the available modem at the second modem center;

the signaling gateway of the first modem center's first data tandem routing the incoming call to the available modem at the second modem center over the dedicated connection.

15. The method of claim 14, wherein the step of establishing a connection to third modem center if the first modem center and the second modem center cannot receive the incoming call and the third modem center can receive the incoming call comprises:

the signaling gateway of the third modem center's data tandem signaling the signaling gateway of the second modem center's first data tandem identifying an available modem at the third modem center;

the signaling gateway of the second modem centers' first data tandem signaling the signaling gateway of the first modem center's first data tandem identifying the available modem at the third modem center;

the signaling gateway of the first modem center's first data tandem routing the incoming call to the available modem at the third modem center over the dedicated connection.

16. A method for optimizing the routing of incoming modem calls among a plurality of geographically distant modem centers comprising the steps of:

determining if an incoming call directed to a first modem center can be optimally received at the first modem center;

if the incoming call cannot be optimally received at the first modem center, determining if the incoming call can be optimally received at the second modem center, wherein determining comprises:

(1) initially identifying a geographic region that is geographically remote from, and in a separate time zone than, the first modem center such that local peak usage times impacting the dial-up Internet call volume that apply in a calling area of the first modem center do not apply to modem centers in the geographic region; and (2) querying the modem centers to identify the second modem center therein that is available to receive the call;

identifying a third modem center as being geographically remote from the second modem center and the first modem center such that the overlap between the peak usage times of the first modem center, the second modem center, and the third modem center is minimized;

if the incoming call cannot be optimally received at the second modem center, determining if the incoming call can be optimally received at the third modem center;

if the incoming call cannot be optimally received at the third modem center, determining if the incoming call can be received at the first modem center;

if the incoming call cannot be received at the first modem center, determining if the incoming call can be received at the second modem center;

if the incoming call cannot be received at the second modem center, determining if the incoming call can be received at the third modem center;

if the incoming call cannot be rerouted within a predetermined time because the first, second, and third modem centers are unavailable, transmitting a busy signal; and otherwise, establishing a connection to one of the first modem center, the second modem center, or the third modem center that is first identified as able to receive the incoming call.

17. The method of claim 16 wherein the first modem center, the second modem center, and the third modem center each comprises a first data tandem having a signaling gateway and a trunking gateway, the trunking gateway controlling at least one remote access server having a plurality of associated modems.

18. The method of claim 17 wherein the first modem center, the second modem center, and the third modem center each further comprises a second data tandem having a signaling gateway and a trunking gateway, the trunking gateway controlling at least one remote access server having the plurality of associated modems.

19. The method of claim 18 wherein the steps of determining if the incoming call can be optimally received at a modem center comprises:

determining whether more than a threshold percentage of the modems associated with each of the remote access servers controlled by the modem center's first data tandem are in use;

if more than a threshold percentage of the modems associated with each of the remote access servers controlled by the modem center's first data tandem are in use, determining whether more than a threshold percentage of the modems associated with each of the remote access servers controlled by the modem center's second data tandem are in use; and if more than a threshold percentage of the modems associated with each of the remote access servers controlled by the modem center's first data tandem are in use and more than a threshold percentage of the modems associated with each of the remote access servers controlled by the modem center's second data tandem are in use, concluding that the call cannot be optimally received at the modem center.

20. The method of claim 19 wherein the steps of determining whether the incoming call can be received at the first modem center, second modem center, and third modem center comprises:

determining whether any one of the associated modems associated with a remote access server controlled by the first data tandem is not in use;

if no modem associated with a remote access server controlled by the first data tandem is not in use, determining whether any one of the associated modems associated with a remote access server controlled by the second data tandem is not in use; and if no modem associated with a remote access server controlled by the first data tandem is not in use and no modem associated with a remote access server controlled by the second data tandem is not in use, concluding that the incoming call cannot be received at the modem center.

21. At least one computer-readable media having computer-executable instructions embodied thereon that, when executed, perform a method for providing dial-up Internet access wherein incoming modem calls directed to a local modem center may be allocated to at least one geographically remote modem centers, the method comprising:

determining whether a modem in the local modem center can receive a call;

if the local modem center cannot receive the call, identifying a first geographically remote modem center can to receive the call, wherein identifying comprises:

(1) initially identifying a geographic region that is geographically remote from, and in a separate time zone than, the local modem center such that local peak usage times impacting the dial-up Internet call volume that apply in a calling area of the first modem center do not apply to modem centers in the geographic region, and (2) querying the modem centers to identify the first geographically remote modem center therein that is available to receive the call; and routing the call over a dedicated connection to one of the local modem center or the first geographically remote modem center that is determined to be able to receive the call.

22. The at least one machine-readable media of claim 21, wherein the method further comprises:

identifying a second geographically remote modem center as being geographically remote from the first geographically remote modem center; and if the first geographically remote modem center cannot receive the call, determining whether a second geographically remote modem center can receive the call, the second geographically remote modem center being located in a separate time zone than the local modem center and the first geographically remote modem.

* * * * *

UNITED STATES PATENT AND TRADEMARK OFFICE
CERTIFICATE OF CORRECTION

PATENT NO.       : 7,636,314 B1                                      Page 1 of 1
APPLICATION NO.  : 10/461228
DATED            : December 22, 2009
INVENTOR(S)      : Orin Paul Reams, III It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1369 days.

Signed and Sealed this

Ninth Day of November, 2010

David J. Kappos
*Director of the United States Patent and Trademark Office*